(12) United States Patent
Rausch (10) Patent No.: US 10,511,391 B1
(45) Date of Patent: Dec. 17, 2019

(54) DYNAMIC RECALIBRATION OF A BEAMFORMER

(71) Applicant: Sprint Communications Company L.P., Overland Park, KS (US)

(72) Inventor: Walter F. Rausch, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/861,334

(22) Filed: Jan. 3, 2018

(51) Int. Cl.
*H04B 17/11* (2015.01)
*H01Q 3/26* (2006.01)
*H04W 16/28* (2009.01)
*H04B 7/06* (2006.01)

(52) U.S. Cl.
CPC ............ *H04B 17/11* (2015.01); *H01Q 3/267* (2013.01); *H04W 16/28* (2013.01); *H04B 7/0617* (2013.01)

(58) Field of Classification Search
CPC ...... H04B 17/11; H04B 7/0617; H01Q 3/267; H04W 16/28
See application file for complete search history.

(56) References Cited

U.S. PATENT DOCUMENTS

2010/0271992 A1* 10/2010 Wentink ............... H04B 17/21
370/310
2016/0226570 A1* 8/2016 Nicholls ............... H01Q 1/246

* cited by examiner

*Primary Examiner* — Mohamed Barakat (57) ABSTRACT

Methods and systems are provided for dynamically recalibrating a beamformer at a cell site based on changes to various characteristics, including environmental characteristics and signal characteristics. A change in temperature, pressure, moisture level, or wind speed may indicate that a recalibration of the beamformer should be triggered. Additionally, at least the phase and amplitude of a received signal from a beacon station, which is used as a reference point, can be compared to the phase and amplitude of a reference signal to determine if one or both of the phase and amplitude has significantly changed. Based on the analysis of the characteristics, recalibration of the beamformer may be triggered.

19 Claims, 4 Drawing Sheets

DYNAMIC RECALIBRATION OF A BEAMFORMER

SUMMARY

The present disclosure is directed, in part, to methods and systems for dynamically recalibrating a beamformer based on the analysis of one or more characteristics. A beacon station may be used, as a reference station, to transmit signals and other information to a cell site having a base station so that the base station can make a dynamic, and real-time determination as to whether one or more beamformers need to be recalibrated. In some instances, channel characteristics, such as a phase and/or amplitude of a signal are analyzed and compared to the phase and amplitude of a reference signal. If the difference of one or both characteristics is more than a predetermined amount, recalibration may be triggered. Other characteristics may include environmental measurements, such as a temperature, pressure, wind speed, moisture level, or the like, which may be measured by the beacon station. The beacon station may send one or more of these measurements to the base station for a determination as to whether any of these has changed more than a predetermined amount. If the temperature, for example, has significantly changed since the last measurement or some other previous point in time, recalibration of the beamformer may be triggered.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In certain aspects, methods are provided for providing a way to dynamically recalibrate beamformers, and in real-time. While beamformers are typically recalibrated at specific and regular intervals of time (statically), efficiencies can be gained from dynamically recalibrating beamformers. For example, various characteristics of either a sent signal or the environment can be analyzed to determine whether a recalibration needs to happen, or whether to wait. In embodiments, a beacon station is utilized to provide a consistent reference point for these various characteristics. Phase and amplitude of a signal received from a beacon station, for example, may be compared to the phase and amplitude of a reference signal to determine whether either or both have values significantly different from the reference values.

In addition, environmental characteristics, such as temperature, pressure, moisture level, and wind speed may be used to determine whether recalibration should be triggered. In aspects, these measurements are taken at or near the beacon station. The beacon station, for instance, may be equipped with a thermometer, an anemometer, an adiabatic sensor, a moisture sensor, or the like to take these measurements. A steep drop in outside temperature, for example, can cause the beamformer to need a recalibration for it to operate effectively. In aspects, the base station or some other network component is responsible for analyzing the characteristics and making the determination as to whether to dynamically recalibrate the beamformer. As used herein, a beamformer is a device, either separate or integrated with an antenna that allows the antenna to engage in beamforming when sending signals to other devices.

The beacon station, as mentioned above, can be any type of device capable of at least transmitting signals, but could also receive signals. For instance, a cell site, by way of its antennas, may transmit a signal, by way of a beamform, to the beacon station, requesting that the beacon station ping back with a signal. The return signal, having an associated phase and amplitude, and at times other types of information, can then be used to determine if recalibration of the beamformer(s) should be triggered. To avoid interference and environmental factors, the beacon station may be positioned away from people, trees, etc., and could even be positioned at a location off the ground, where there is significant movement. This could be on a building, a tower, a bridge, etc. It is helpful if the time it takes for the beacon station to transmit the reference signal to the time the base station returns a signal to the beacon station is less than the coherence time, which is the length of time that the acquired channel knowledge is valid. Less motion in the environment and lower delay spread contribute to obtaining a longer coherence time, which is one reason the beacon station may be placed away from areas having significant movement.

In a first aspect, one or more computer-readable media having computer-executable instructions embodied thereon are provided that, when executed, perform a method for dynamically recalibrating a beamformer. The method comprises, at a base station having at least one beamformer, receiving, from a beacon station, a signal having a first set of channel characteristic, and analyzing the first set of channel characteristics to determine that there is more than a predetermined difference between the first set of channel characteristics and a second set of channel characteristics. The second set of channel characteristics are channel characteristics that are associated with a reference signal. Further, the method comprises, based on the analyzing, triggering a dynamic recalibration of the at least one beamformer at the base station.

In another aspect, a method for dynamically recalibrating a beamformer at a base station is provided. The method comprises, at a base station having at least one beamformer, communicating a first signal, using beamforming, to a beacon station that is stationary and that is away from any movement such that a channel used by the beacon station to transmit signals remains constant. The method also comprises, in response to the first signal, receiving a second signal from the beacon station, determining, from the second signal, that the at least one beamformer at the base station is to be recalibrated, and based on the determining, automatically recalibrating the at least one beamformer at the base station.

In yet another aspect, a dynamic recalibration system for dynamically recalibrating a beamformer at a base station is provided. The dynamic recalibration system comprises a processor, and one or more computer storage hardware devices storing computer-usable instructions that, when used by the processor, cause the processor to perform a method. The method comprises receiving, from a beacon station, an indication at a base station that one or more characteristics have changed, as measured by the beacon station, determining that the change of the one or more characteristics warrants a recalibration of at least one beamformer at the base station, and recalibrating the at least one beamformer at the base station.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 30$^{th}$ Edition (2016).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
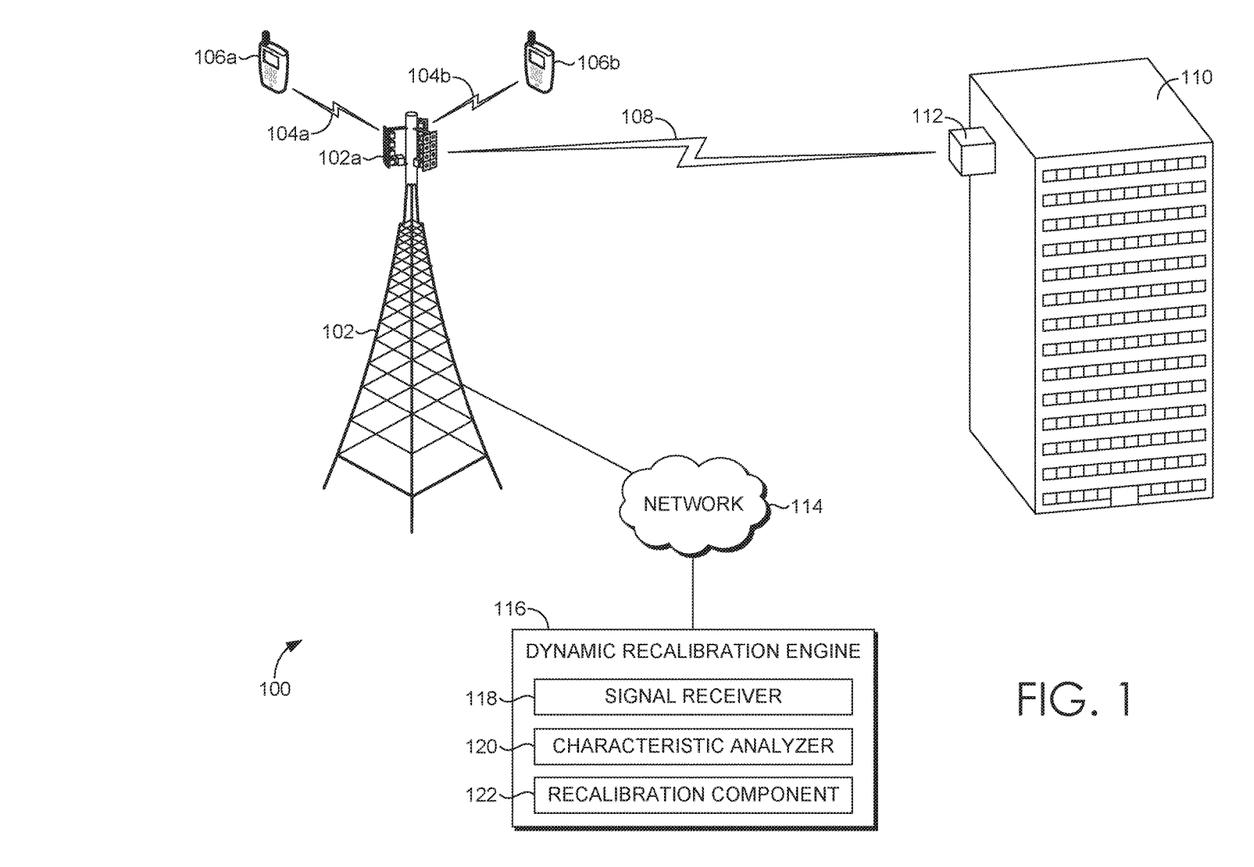
FIG. 1 depicts a diagram of an exemplary operating environment suitable for use in implementations of the present disclosure.

FIG. 1 provides an exemplary network environment in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes cell site 102, user devices 106a and 106b, structure 110, beacon station 112, and dynamic recalibration engine 116. Cell site 102 may include a base station, cell tower and other network components used to communicate and receive signals from mobile devices and other cell sites to provide coverage for user devices in the coverage area. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices.

Figure 6:
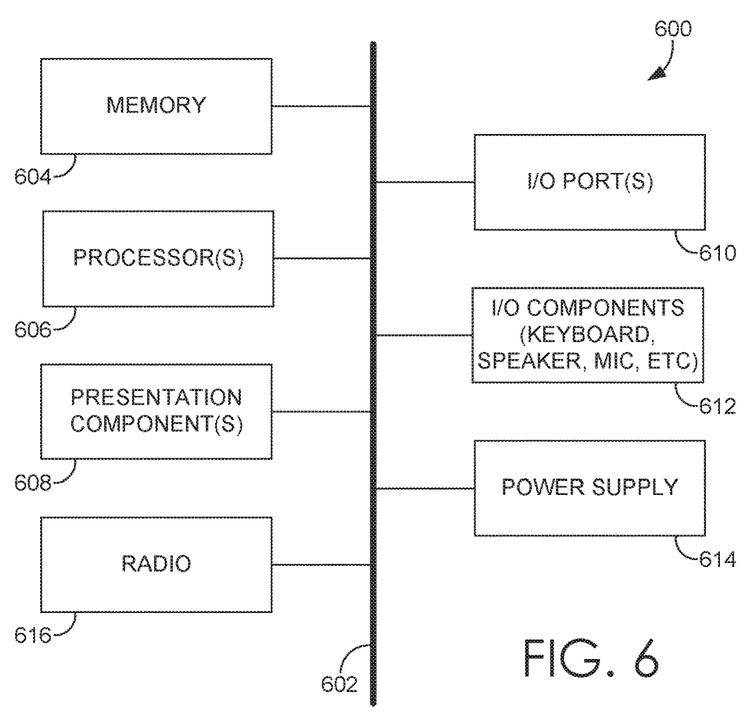
FIG. 6 depicts a diagram of an exemplary computing environment suitable for use in implementations of the present disclosure.

In some aspects, the user devices 106a and 106b can correspond to computing device 600 in FIG. 6. Thus, a user device can include, for example, a display(s), a power source(s) (e.g., a battery), a data store(s), a speaker(s), memory, a buffer(s), a radio(s) and the like. In some implementations, a user device 106a and 106b comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices 106a and 106b in network environment 100 can optionally utilize a network, such as network 114, to communicate with other user devices (e.g., a mobile device(s), a server(s), a personal computer(s), etc.) through cell site 102. The network may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. The network can include multiple networks, as well as being a network of networks, but is shown in more simple form so as to not obscure other aspects of the present disclosure.

A network can be part of a telecommunication network that connects subscribers to their immediate service provider. In some instances, a network can be associated with a telecommunications provider that provides services (e.g., LTE) to user devices, such as user devices 106a and 106b. For example, the network may provide voice services to user devices or corresponding users that are registered or subscribed to utilize the services provided by a telecommunications provider. The network can comprise any communication network providing voice and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, cell site 102 is configured to communicate, such as by signals 104a and 104b, with user devices, such as user devices 106a and 106b that are located within the geographical area, or cell, covered by radio antennas of cell site 102. Cell site 102 may include one or more base stations, base transmitter stations, radios, antennas, transmitters/receivers, digital signal processors, control electronics, GPS equipment, and the like. In particular, cell site 102 may selectively communicate with the user devices using beamforming. In general, beamforming is a signal processing technique for directional signal transmission or reception. When it is desired to change the directionality of an array when transmitting radio frequency signal from an antenna at a cell site, a beamformer controls the phase and relative amplitude of the signal at each transmitter. As used herein, a beamformer may be the portion of the cell site 102 that is responsible for beamforming, or may also include the antenna that transmits beamformed signals.

While cell site 102 communicates with user devices 106a and 106b, cell site 102 may also communicate, such as by way of signal 108, with other devices that have a receiver and/or a transmitter, such as beacon station 112. Beacon station 112, as used herein, is a device that is capable of receiving and/or transmitting signals. For instance, in one implementation, beacon station 112 is a device that can both receive and transmit signals for communication with a base station, such as the base station associated with cell site 102. While beacon station 112 may be a passive device in some instances, beacon station 112 may also act as an active device and assist with determining when to recalibrate a beamformer associated with cell site 102. Typically, beamformers recalibrate at specific intervals of time, where the interval of time is predetermined by the manufacturer or the installer. For example, the recalibration interval may be every 30 minutes, every hour, every 5 hours, every 24 hours, etc. However, there are potential down sides to only recalibrating at set intervals of times. For instance, environmental factors (e.g., temperature, pressure, moisture, wind speed) may necessitate a recalibration of the beamformer, as a drop in temperature, for example, can cause a beamformer to have associated inaccuracies. Calibration, or recalibration, is generally a set of operations that establish a relationship between values measured/indicated by a measuring instrument, and a reference standard. When these values begin to drift apart, recalibration may be necessary.

Implementations herein allow for recalibration to be performed dynamically, where the necessity for recalibration is done in real-time. Instead of predetermined intervals of times when recalibration is performed, various factors are measured and analyzed to determine if recalibration is necessary. In some instances, recalibration may be necessary more often than the predetermined intervals of time, which would provide many advantages, including better beamforming, leading to increased throughput and user experience. But when recalibration is not needed as often as the predetermined intervals of time, network resources are saved, and thus not unnecessarily used.

Returning to FIG. 1, cell site 102, and in particular, antennas 102a are used to transmit a signal to beacon station 112. Beacon station 112 may, in return, transmit a signal over a channel back to cell site 102. The signal from beacon station 112 to cell site 102 may include channel characteristics, including a phase and an amplitude. As mentioned, beacon station 112 may be positioned in such a way as to consistently transmit signals over a known channel, the signals comprising at least a phase and amplitude. For example, during set up or installation of the beacon station 112, it may be determined which channel will be used for communication with cell site 102, and what the channel characteristics (e.g., phase and amplitude) are based on a reference signal. Once those parameters are known, when the beacon station 112 transmits a subsequent signal to cell site 102 with a phase and amplitude, if either or both of the phase or amplitude differ by more than a predetermined amount to the phase and amplitude of the reference signal, recalibration may dynamically be triggered for the beamformer.

Cell site 102 may also communicate with a dynamic recalibration engine 116 by way of network 114, which has been described above. Dynamic recalibration engine 116 may perform some of the functions described above herein regarding determining when to trigger a recalibration of the beamformer. As mentioned, this could include an assessment of channel characteristics included in a signal from beacon station 112 to cell site 102, or could include determining that there has been a change in an environmental condition, such as measured by beacon station 112. These environmental conditions could include, for example, temperature, pressure, wind speed, moisture level, etc. In some embodiments, beacon station 112 has the necessary equipment to take these measurements and communicate them back to the cell site 102, but in other embodiments, some other equipment is used separate from beacon station 112 to take the measurements.

Dynamic recalibration engine 116 includes a signal receiver 118, a characteristic analyzer 120, and a recalibration component 122. Generally, the signal receiver 118 receives signals from beacon station 112, where the signals include information, such as phase, amplitude, or environmental characteristics. The characteristic analyzer 120 analyzes this information and determines whether the beamformer at cell site 102 is to be recalibrated at that time. In some instances, the phase and amplitude of the received signal may not have changed more than a predetermined amount when compared to the phase and amplitude of the reference signal. In these cases, recalibration of the beamformer will not be triggered. But, in other cases, the characteristic analyzer 120 may analyze the received information and the signal itself and determine that recalibration is to be triggered. For example, one or more of the phase and amplitude of the received signal differs more than a predetermined amount from the phase and amplitude of the reference signal, recalibration may be triggered. Alternatively, if an environmental factor, such as temperature, pressure, wind speed, or moisture has changed from a previous measurement, or from when the beacon station 112 was installed or last calibrated, a recalibration may be triggered. These are provided solely for exemplary purposes only, and not for limitation. Other factors may be used to make a dynamic determination that recalibration is to be triggered.

Recalibration component 122 is generally responsible for taking the output from characteristic analyzer 120 and determining whether or not recalibration of the beamformer is to be triggered. For example, if characteristic analyzer 120 finds that there has been a significant temperature decrease, such as 5 degrees, 10 degrees, 15 degrees, 20 degrees, etc., since the last measurement, as measured by beacon station 112, recalibration component 122 may determine that the beamformer needs to be recalibrated. Recalibration component 122 then communicates to the cell site 102 (e.g., base station, eNodeB) that the beamformer is to be recalibrated. In some embodiments, dynamic recalibration engine 116 is a stand-alone network component, such as computing device 600 of FIG. 6. In other embodiments, dynamic recalibration engine 116 is part of cell site 102, such as a component of the base station or eNodeB.

Figure 2:
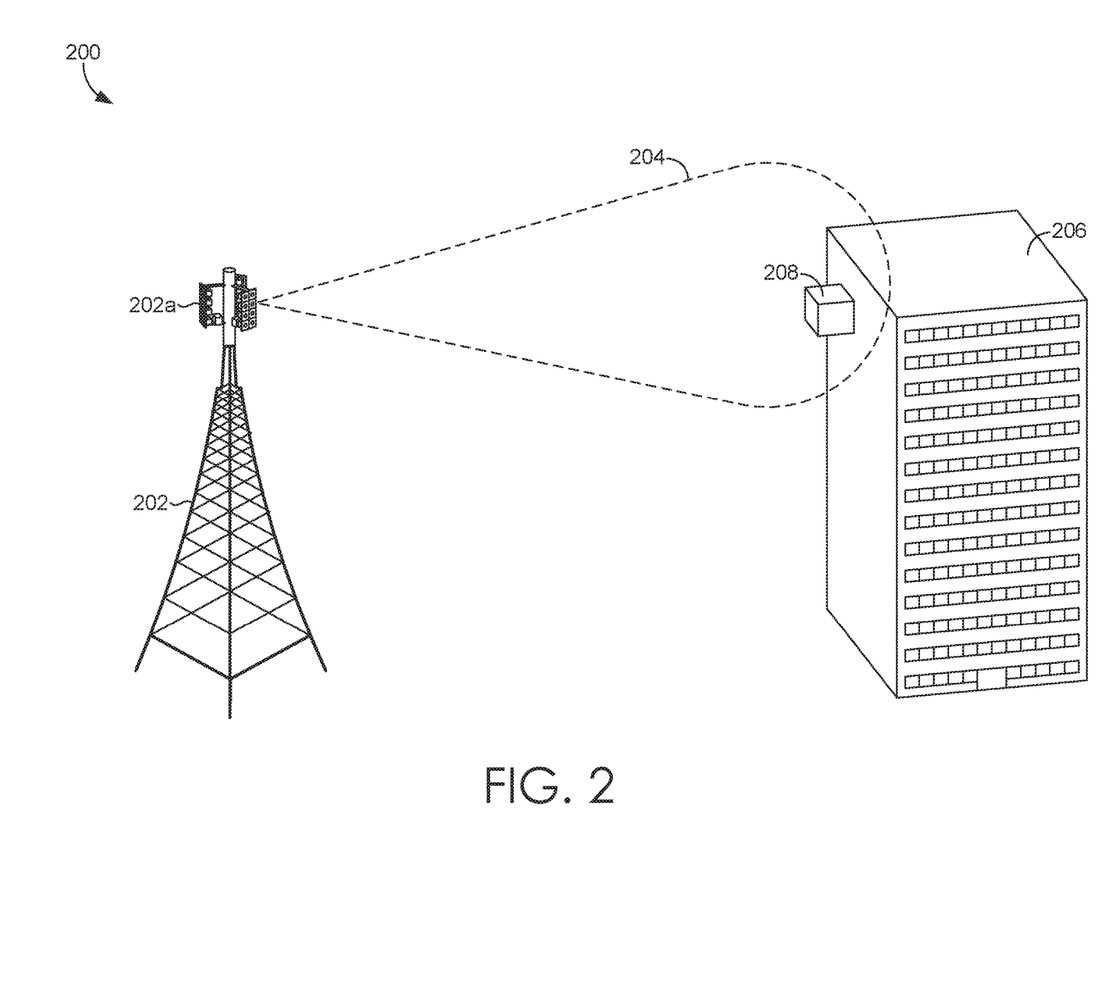
FIG. 2 depicts a diagram of a cell site communicating with a beacon station using beamforming, in accordance with implementations of the present disclosure.

FIG. 2 depicts a diagram 200 of a cell site communicating with a beacon station using beamforming, in accordance with implementations of the present disclosure. FIG. 2 illustrates cell site 202, having antenna array 202a, which includes one or more beamformers that operate to produce beamforms when the antennas transmit a signal to devices, such as beacon station 208. Here, beamform 204 is illustrated surrounding beacon station 208, which is secured in some fashion to structure 206. Structure 206 could be a building, home, store, sky scraper, tower, bridge, or the like. As shown in FIG. 2, beacon station 208 is secured to structure 206 at a relatively high location off of the ground. In implementations, beacon station 208 is intentionally placed high off the ground in an area where nothing is moving around it (e.g., leaves, trees, people, animals). This provides the greatest chance that the channel used to transmit signals to the cell site 202 remains unchanged and is clear, and that the phase and amplitude of that signal remains constant, if nothing else, such as environmental factors, changes. In some embodiments, it is desired to have a long coherence time, which is measured as the length of time that the acquired channel knowledge is valid. For instance, it is desired that the moment the beacon station 208 transmits a reference signal, until the moment the cell site 202 (e.g., base station) returns a signal to beacon station 208 is less than the total coherence time. If the beacon station 208 were to be placed on or near the ground, the coherence time would be short, not allowing the incoming signal to cell site 202 to be returned in that amount of time.

In embodiments, each antenna in antenna array 202a at cell site 202 may have its own beamformer, such that it is capable of beamforming. As such, multiple beamformers may be dynamically recalibrated according to the methods disclosed herein. All antennas at a cell site could use a single beacon station, such as beacon station 208, or could use separate beacon stations.

Figure 3:
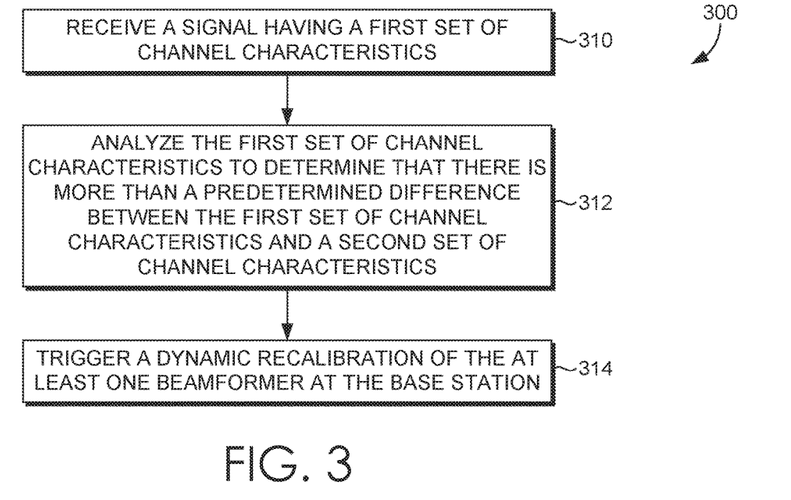
FIG. 3 depicts a flow diagram of an exemplary method for dynamically recalibrating a beamformer, in accordance with implementations of the present disclosure.

Turning now to FIG. 3, FIG. 3 depicts a flow diagram of an exemplary method 300 for dynamically recalibrating a beamformer, in accordance with implementations of the present disclosure. Initially at block 310, a signal is received, such as at a base station, having a first set of channel characteristics. In embodiments, the signal is sent from a beacon station, which is a device that has a transmitter and/or a receiver for sending and receiving signals. The beacon station, in embodiments, positioned at a high enough location (e.g., on a tall building, on a tower) so that the transmission channel used by the beacon station to send a signal to the base station does not change, and so that movement, such as people, trees, leaves, and other impairments, does not affect the signal transmission and cause interference. Channel characteristics may include, for example, a phase and an amplitude. As is known in the art, the phase of a wave is the position of a point in time on a waveform cycle. The amplitude of a wave is the distance between the midline of the wave and its crest.

At block 312, the first set of channel characteristics is analyzed to determine that there is more than a predetermined difference between the first set of channel characteristics and a second set of channel characteristics. The second set of channel characteristics may be channel characteristics that are associated with the reference signal, where the reference signal is a signal sent from the beacon station to a cell site during an initial set up or installation of the beacon station so that channel characteristics of subsequent signals can be compared to channel characteristics of the reference signal to determine if something has changed that necessitates a recalibration of the beamformer. For example, when the beacon station is installed or otherwise set up, there may be an initial calibration that determines a phase and an amplitude associated with a reference signal (e.g., sent under optimal conditions) sent from the beacon station to the base station. That phase and amplitude are referred to herein as reference channel characteristics, or here, the second set of channel characteristics. Reference channel characteristics are known by the base station and are compared to the channel characteristics associated with subsequent signals sent by the beacon station to the base station. Thus, the phase and amplitude of subsequent signals sent by the beacon station to the base station can then be analyzed to determine if they are within a threshold amount of the reference phase and amplitude. At block 314, a dynamic recalibration of the beamformer at the base station is triggered. For example, if the phase and amplitude of the received signal are outside an acceptable range from the reference phase and amplitude, recalibration of the beamformer may be triggered. In embodiments, the beamformer is part of the antenna and is integrated thereto such that the antenna, having beamforming capabilities by way of the beamformer, is recalibrated. In other embodiments, the beamformer is a separate component and may be recalibrated separately than the antenna.

Figure 4:
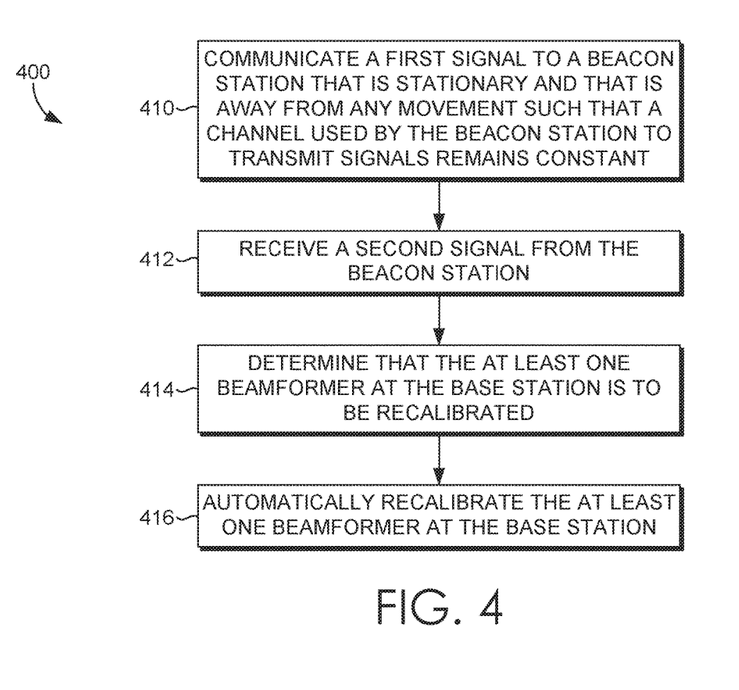
FIG. 4 depicts a flow diagram of another exemplary method for dynamically recalibrating a beamformer, in accordance with implementations of the present disclosure.

FIG. 4 depicts a flow diagram of another exemplary method 400 for dynamically recalibrating a beamformer, in accordance with implementations of the present disclosure. At block 410, a first signal is communicated to a beacon station, from a cell site having at least one beamformer, where the beacon station is stationary and is away from any movement so that a channel used by the beacon station to transmit signals remains constant. At block 412, a second signal is received from the beacon station. The second signal is sent by the beacon station in response to the first signal sent from the beamformer to the beacon station.

At block 414, it is determined that the beamformer at the cell site is to be recalibrated. As described above, this determination may be made by analyzing the second signal. In some embodiments, the second signal may indicate that one or more of a temperature, pressure, moisture level, or wind speed has changed, where the change, or delta, is above a predetermined threshold. For instance, if the temperature has suddenly decreased by more than 5 degrees, 10 degrees, 15 degrees, 20 degrees, or the like, block 414 may determine that recalibration of the beamformer should occur. In some instances, the beacon station is responsible for taking the measurements, and may be equipped with a thermometer, an anemometer, an adiabatic sensor, moisture sensor, etc. Alternatively, the second signal received from the beacon station, could be analyzed for its phase and amplitude values. One or both of the phase and amplitude could be analyzed and compared to the phase and amplitude of the reference signal to determine whether there is a change in one or both values above a predetermined amount. At block 416, the beamformer is automatically recalibrated based on the determining of block 414. Automatic recalibration in some instances may be done without human intervention.

Figure 5:
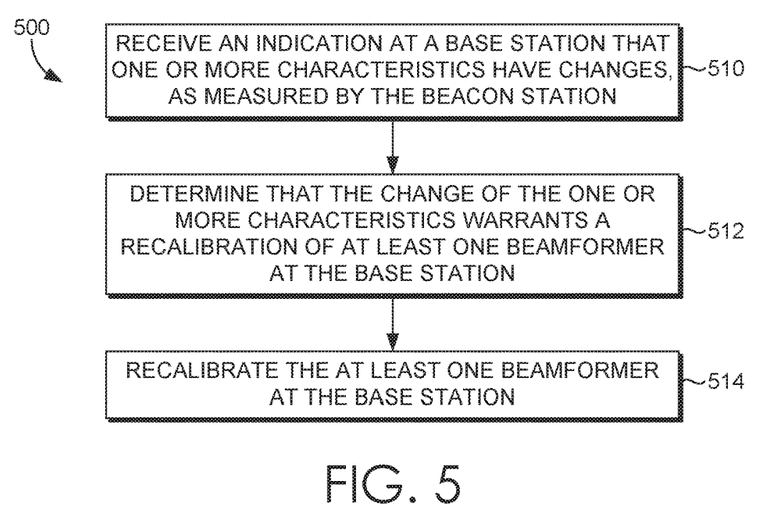
FIG. 5 depicts a flow diagram of another exemplary method for dynamically recalibrating a beamformer, in accordance with implementations of the present disclosure.

Turning to FIG. 5, a flow diagram is depicted of another exemplary method 500 for dynamically recalibrating a beamformer, in accordance with implementations of the present disclosure. At block 510, an indication is received from a beacon station that one or more characteristics have changed, the characteristics having been measured by the beacon station. These characteristics could include, for exemplary purposes only, a temperature, pressure, moisture level, or wind speed. The beacon station could be equipped with one or more of a thermometer, an anemometer, an adiabatic sensor, or a moisture sensor in order to take these measurements. In other embodiments, the one or more characteristics could be channel characteristics including a phase and amplitude of the signal transmitted from the beacon station to the base station. At block 512, it is determined that the change of the characteristics warrants a recalibration of at least one beamformer at the base station. The base station, in an embodiment, may analyze the one or more characteristics, such as if the characteristics are channel characteristics, such as a phase and amplitude, and may compare them to the phase and amplitude of the reference signal. However, in other embodiments, the beacon station may analyze the characteristics and determine if there has been a change from a previous measurement, such as if the characteristics are environmental measurements, such as temperature, pressure, moisture levels, wind speed, etc. At block 514, the at least one beamformer at the base station is recalibrated.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 602 that directly or indirectly couples the following devices: memory 604, one or more processors 606, one or more presentation components 608, input/output (I/O) ports 610, I/O components 612, and power supply 614. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 606 that read data from various entities such as bus 602, memory 604 or I/O components 612. One or more presentation components 608 presents data indications to a person or other device. Exemplary one or more presentation components 608 include a display device, speaker, printing component, vibrating component, etc. I/O ports 610 allow computing device 600 to be logically coupled to other devices including I/O components 612, some of which may be built in computing device 600. Illustrative I/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 616 might additionally or alternatively facilitate other types of wireless communications including Wi-Fi, WiMAX, LTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for dynamically recalibrating a beamformer, the method comprising:
at a base station having at least one beamformer, receiving, from a beacon station, a signal having a first set of channel characteristics describing properties of the signal itself;
analyzing the first set of channel characteristics to determine that there is more than a predetermined difference between the first set of channel characteristics and a second set of channel characteristics, the second set of channel characteristics being channel characteristics that are associated with a reference signal; and
based on the analyzing, triggering a dynamic recalibration of the at least one beamformer at the base station.

2. The one or more non-transitory computer-readable media of claim 1, wherein the channel characteristics comprising a phase and an amplitude.

3. The one or more non-transitory computer-readable media of claim 1, wherein the beacon station is stationary.

4. The one or more non-transitory computer-readable media of claim 3, wherein the beacon station has a known return channel with the second set of channel characteristics when the beacon station transmits a signal to the base station.

5. The one or more non-transitory computer-readable media of claim 1, wherein the beamformer is an antenna that is capable of beamforming.

6. The one or more non-transitory computer-readable media of claim 1, wherein the predetermined difference between the first set of channel characteristics and the second set of channel characteristics is a difference in one or more of a phase or an amplitude.

7. The one or more non-transitory computer-readable media of claim 1, wherein the beacon station is positioned at a known location to the base station.

8. A method for dynamically recalibrating a beamformer at a base station, the method comprising:
at a base station having at least one beamformer, communicating a first signal, using beamforming, to a beacon station that is stationary and that is away from any movement such that a channel used by the beacon station to transmit signals remains constant;
in response to the first signal, receiving from the beacon station a second signal that includes a first set of channel characteristics descriptive of the second signal itself;
determining, from the second signal, that the at least one beamformer at the base station is to be recalibrated; and
based on the determining, automatically recalibrating the at least one beamformer at the base station.

9. The method of claim 8, wherein the second signal indicates that a change in environmental conditions, including one or more of a temperature, a pressure, a moisture, or wind speed as measured by the beacon station is above a predetermined threshold.

10. The method of claim 9, wherein the determining that the at least one beamformer at the base station is to be recalibrated is based on the change in the one or more of the temperature, the pressure, the moisture, or the wind speed as measured by the beacon station being above the predetermined threshold.

11. The method of claim 8, wherein the beacon station comprises one or more of a thermometer, an anemometer, an adiabatic sensor, or a moisture sensor.

12. The method of claim 8, wherein the first set of channel characteristics that comprise at least a phase and an amplitude.

13. The method of claim 12, further comprising comparing the first set of channel characteristics to a second set of channel characteristics having at least an expected phase and amplitude.

14. The method of claim 12, further comprising determining that there is at least a predetermined difference between the first set of channel characteristics and the second set of channel characteristics.

15. The method of claim 14, wherein the determining that the at least one beamformer at the base station is to be recalibrated is based on there being at least the predetermined difference between the first set of channel characteristics and the second set of channel characteristics.

16. A dynamic recalibration system for dynamically recalibrating a beamformer at a base station, the dynamic recalibration system comprising:
a processor; and
one or more computer storage hardware devices storing computer-usable instructions that, when used by the processor, cause the processor to:
receiving, from a beacon station, an indication at a base station that one or more characteristics have changed, as measured by the beacon station, the one or more characteristics comprising at least one of a phase of a signal transmitted from the beacon station, an amplitude of the signal transmitted from the beacon station, or an environmental characteristic;

determining that the change of the one or more characteristics warrants a recalibration of at least one beamformer at the base station; and recalibrating the at least one beamformer at the base station.

17. The dynamic recalibration system of claim 16, wherein the environmental characteristic comprises at least one of a temperature, a pressure, a moisture, or wind speed as measured by the beacon station.

18. The dynamic recalibration system of claim 16, wherein the beacon station comprises one or more of a thermometer, an anemometer, an adiabatic sensor, or a moisture sensor.

19. The dynamic recalibration system of claim 16, further comprising comparing the first set of channel characteristics to a second set of channel characteristics from a reference signal, the reference signal comprising a phase and amplitude, the comparing to determine that there has been the change that warrants the recalibration of the at least one beamformer at the base station.

* * * * *